US010282602B1

(12) United States Patent
Edwards et al.

(10) Patent No.: US 10,282,602 B1
(45) Date of Patent: May 7, 2019

(54) SYSTEMS AND METHODS FOR CAPTURING ELECTRONIC SIGNATURES

(71) Applicant: CAPITAL ONE SERVICES, LLC, McLean, VA (US)

(72) Inventors: Joshua Edwards, Philadelphia, PA (US); Michael Mossoba, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/129,928

(22) Filed: Sep. 13, 2018

(51) Int. Cl.
*G06K 9/00* (2006.01)
*H04L 9/32* (2006.01)
*G06F 3/01* (2006.01)
*G06T 11/20* (2006.01)
*G06F 3/0346* (2013.01)
*G06F 3/03* (2006.01)

(52) U.S. Cl.
CPC ......... *G06K 9/00355* (2013.01); *G06F 3/017* (2013.01); *G06F 3/0325* (2013.01); *G06F 3/0346* (2013.01); *G06T 11/203* (2013.01)

(58) Field of Classification Search
USPC ........ 382/100, 103, 106–107, 115–119, 155, 382/162, 168, 173, 181, 188, 191, 382/200–203, 217, 232, 254, 274, 276, 382/286–294, 305, 312; 715/268; 713/176
See application file for complete search history.

(56) References Cited

U.S. PATENT DOCUMENTS

| | | | |
|---|---|---|---|
| 2011/0060910 A1* | 3/2011 | Gormish | G06Q 10/10 713/176 |
| 2014/0281945 A1* | 9/2014 | Avni | G06T 1/0021 715/268 |
| 2016/0210602 A1* | 7/2016 | Siddique | G06Q 20/0453 |
| 2016/0335479 A1* | 11/2016 | Bartlett, II | H04L 63/126 |
| 2018/0267946 A1* | 9/2018 | Dang | G06F 17/243 |

* cited by examiner

*Primary Examiner* — Seyed H Azarian
(74) *Attorney, Agent, or Firm* — Finnegan, Henderson, Farabow, Garrett & Dunner, LLP

(57) ABSTRACT

Methods and systems for generating electronic signatures are disclosed. In some embodiments, the method includes: storing pixel features of a signing device; capturing, via an imaging device, a plurality of image frames including the pixel features of the signing device; identifying in the plurality of image frames, by a processor, first pixels matching the stored pixel features of the signing device; generating, by the processor, a first image including the identified pixels; and connecting, by the processor, the identified pixels to form at least one line drawing representing a signature.

20 Claims, 7 Drawing Sheets

SYSTEMS AND METHODS FOR CAPTURING ELECTRONIC SIGNATURES

BRIEF DESCRIPTION

Technical Field

The present disclosure generally relates to capturing and generating electronic signatures, and more particularly, to a system and method for capturing an electronic signature based on the movement of a finger or object in the air.

BACKGROUND

Electronically or digitally created signatures have been used more and more frequently in daily life. Currently, there are several ways to electronically capture a user's real signature. For example, the user can handwrite her signature on a piece of paper and then hold the paper in front of a camera such that the camera can take an image of the paper. Subsequently, the signature can be extracted from the image and saved in a digital form. As another example, the user can upload a scanned copy of a previously signed document to a computer, which then recognizes the signature on the scanned document and saves it in a digital form. For yet another example, the user can draw the signature by moving a mouse or trackball, or sliding a finger or pen on a touch-screen or trackpad.

These electronic signature capturing technologies makes it feasible to generate an electronic signature mimicking the user's real, handwritten signature, and thus have been widely used in various computerized transactions. For example, the user can electronically sign a document online, without the need of printing the document, physically signing it, and mailing the signed document to the recipient. Moreover, with the user's permission, the electronic signature can be reused for multiple documents, thereby saving the user the trouble of repeatedly signing multiple documents. As another example, a retailer can collect customers' electronic signatures at a point-of-sale (POS) terminal, and thus avoid the process of print paper receipts, requesting that the customers sign the receipts, and storing or archiving the signed receipts.

However, the existing methods for capturing an electronic signature are still burdensome because they require the presence of extra devices such as scanner, mouse, track ball, trackpad, touch-screen, etc., which may not be available in many settings. For example, it may not be feasible for a mobile POS machine or an automated teller machine (ATM) to carry a mouse or touch-screen. Moreover, the existing methods require people to write on a device (e.g., paper, touch-screen, trackpad) or manipulate a device (e.g., mouse, trackball) to create an electronic signature. This may be challenging to physically impaired people. For example, patients suffering from hand or finger arthritis often find it difficult, painful, or even impossible to use a mouse, touch-screen, or the like.

BRIEF SUMMARY

The disclosed embodiments include cloud-based content-sharing systems and methods.

In one embodiment, a computer-implemented method for generating electronic signatures is disclosed. The method includes storing pixel features of a signing device. The method also includes capturing, via an imaging device, a plurality of image frames including the pixel features of the signing device. The method also includes identifying in the plurality of image frames, by a processor, first pixels matching the stored pixel features of the signing device. The method also includes generating, by the processor, a first image including the identified pixels. The method further includes connecting, by the processor, the identified pixels to form at least one line drawing representing a signature.

In another embodiment, a computer-implemented method for generating electronic signatures is disclosed. The method includes capturing, via an imaging device, a plurality of image frames of a finger. The method also includes identifying in the plurality of image frames, by a processor, first pixels representing the finger, based on pixel features of the first pixels. The method also includes generating, by the processor, a first image including the identified pixels. The method further includes connecting, by the processor, the identified pixels to form at least one line drawing representing a signature.

In another embodiment, a system for generating electronic signatures is disclosed. The system includes an imaging device. The system also includes a memory storing instructions. The system further includes a processor in communication with the imaging device, the processor being configured to execute the instructions to: storing pixel features of a signing device; control the imaging device to capture a plurality of image frames showing the signing device; identify, in the plurality of image frames, pixels matching the recognized pixel features of the signing device; generate a first image including the identified pixels; connect the identified pixels to form at least one line drawing representing a signature.

Aspects of the disclosed embodiments may include non-transitory, tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary disclosed embodiments and, together with the description, serve to explain the disclosed embodiments. In the drawings.

DETAILED DESCRIPTION

Reference will now be made to exemplary embodiments, examples of which are illustrated in the accompanying drawings and disclosed herein. Wherever convenient, the same reference numbers will be used throughout the drawings to refer to the same or like parts.

As used in the present disclosure, "electronic signature" or "digital signature" refers to image data representing a user's real signature, i.e., a digital form of line drawing that constitutes the user's handwritten signature, rather than a conformed signature (a.k.a., s-signature). The disclosed embodiments are directed to a system and method for capturing such electronic or digital signature. In particular, the disclosed system includes an imaging device for capturing images of the user's finger or an object (e.g., a laser pointer) held by the user. In the following description, the finger and object are collectively referred to as "signing device." To create an electronic signature, the user can wave the finger or object in front of the imaging device, to form a pattern mimicking the user's handwritten signature. The system uses image recognition algorithms to recognize the pattern from the captured images and generate an electronic signature based on the recognized pattern.

Figure 1:
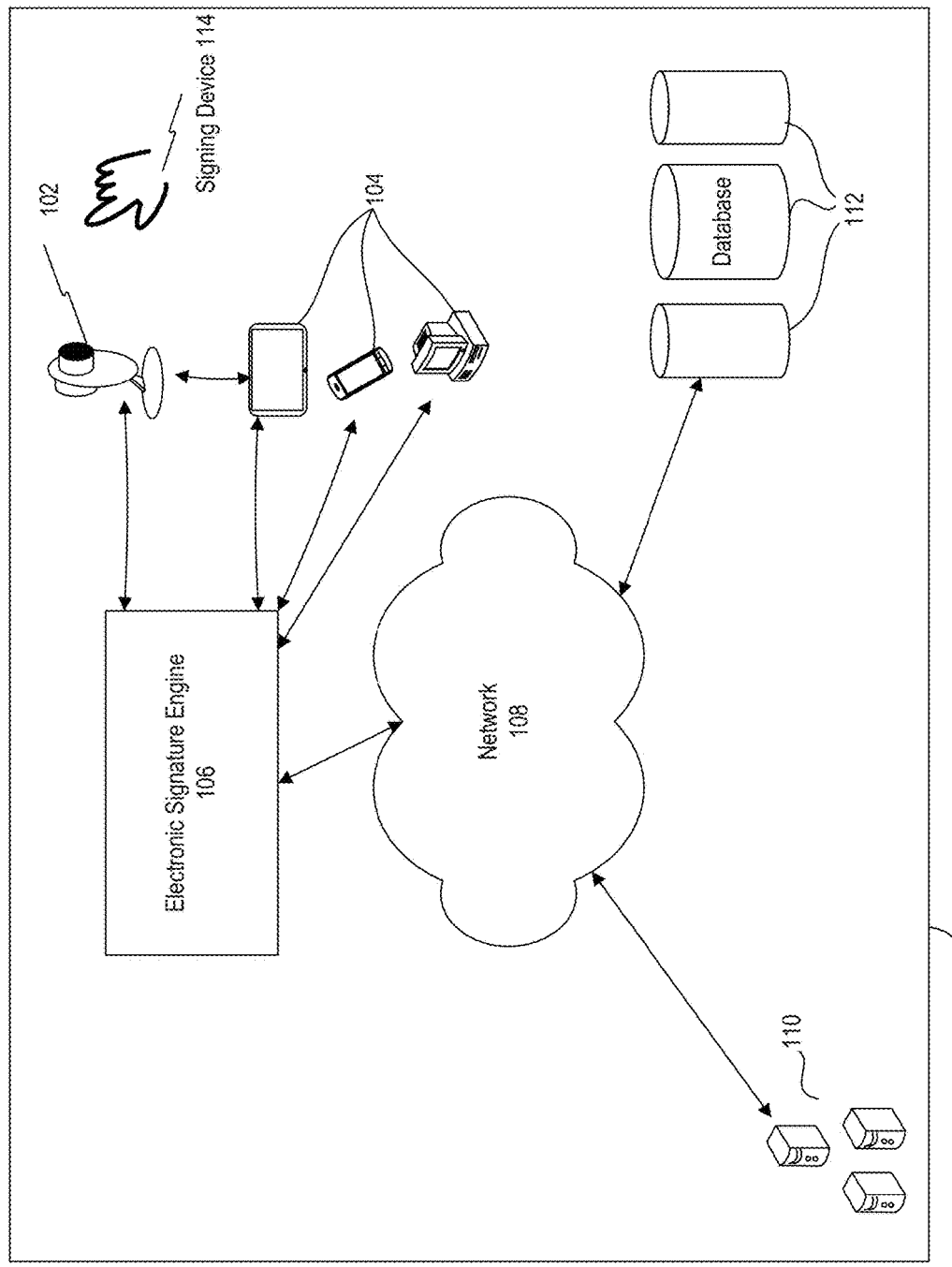
FIG. 1 is a schematic diagram illustrating an exemplary system for capturing an electronic signature, consistent with disclosed embodiments.

FIG. 1 is a schematic diagram illustrating an exemplary system 100 for capturing electronic signatures, consistent with disclosed embodiments. Referring to FIG. 1, system 100 may include an imaging device 102, user terminal(s) 104, an electronic signature engine 106, a network 108, server(s) 110, and database(s) 112. The components and arrangement of the components included in system 100 may vary. Thus, system 100 may further include other components or devices that perform or assist in the performance of one or more processes consistent with the disclosed embodiments. The components and arrangements shown in FIG. 1 are not intended to limit the disclosed embodiments, as the components used to implement the disclosed processes and features may vary.

Imaging device 102 may be a digital camera, a web camera, a charge-coupled device (CCD) or complementary metal-oxide semiconductor (CMOS) image sensor, etc. In operation, a user may move a signing device 114 in front of imaging device 102. Signing device 114 may be a finger of the user or an object held by the user. In the disclosed embodiments, imaging device 102 can capture images or videos of signing device 114.

User terminal 104 may be a personal computer, a laptop, a tablet, a mobile phone, a smart phone, a kiosk, an automated teller machine (ATM), a Point-of-Sale (POS) machine, etc. In some embodiments, imaging device 102 is integrated into user terminal 104. In some embodiments, imaging device 102 is in communication with user terminal 104, such that imaging device 102 can be controlled by user terminal 104 to take images or videos of signing device 114, and/or transmit the images or videos of signing device 114 to user terminal 104.

Electronic signature engine 106 may be implemented using different equipment, such as one or more supercomputers, one or more personal computers, one or more servers, one or more mainframes, one or more mobile devices, or the like. In some embodiments, electronic signature engine 106 may comprise hardware, software, and/or firmware modules. Electronic signature engine 106 may be configured to enable the capturing and generating of a digital signature. For example, electronic signature engine 106 may control imaging device 102 to take images or videos of signing device 114, and/or cause imaging device 102 to send the captured images or videos to electronic signature engine 106 for processing. Electronic signature engine 106 may also be configured to recognize signing device 114 in the captured images or videos and generate an electronic signature based on movement of signing device 114.

In some embodiments, electronic signature engine 106 may be stored in user terminal 104. For example, electronic signature engine 106 may be implemented in a user's personal computer which includes a camera (e.g., imaging device 102), such that the user can use the personal computer to capture her electronic signature. As another example, electronic signature engine 106 may be implemented in an ATM machine that has a camera function. Electronic signature engine 106 may control the ATM machine to capture the user's electronic signature, and provide it to a financial service provider (e.g., a bank, credit union, credit card issuer, or other type of financial service entity). As yet another example, electronic signature engine 106 may be implemented in a POS terminal operated by a merchant, who can use the POS terminal to capture a customer's electronic signature.

Network 108, in some embodiments, may comprise one or more interconnected wired or wireless data networks that receive data from one device (e.g., user terminal 104 or electronic signature engine 106) and send it to another device (e.g., server 110 or database 112). For example, network 108 may be implemented as one or more of the Internet, a wired Wide Area Network (WAN), a wired Local Area Network (LAN), a wireless LAN (e.g., IEEE 802.11, Bluetooth, etc.), a wireless WAN (e.g., WiMAX), and the like. Each component in system 100 may communicate bidirectionally with other system 100 components either through computer network 108 or through one or more direct communication links, (not all are shown).

Server 110 may be a single server or may be configured as a distributed computer system including multiple servers or computers that interoperate to perform one or more of the processes and functionalities associated with the disclosed embodiments. Server 110 may be implemented using a variety of different equipment, such as a supercomputer, personal computer, a mainframe, a mobile device, or the like. Server 110 may include multiple modules or nodes working collaboratively to run various applications, software modules, analytical modules, rule engines, etc.

In some embodiments, electronic signature engine 106 may be stored in server 110. For example, while the user waves signing device 114 to draw a pattern in the air that represents her signature, image device 102 and/or user terminal 104 may capture images of signing device 114 and transmit the images to server 110 via network 108. Electronic signature engine 106 running on server 110 may analyze the images and generate image data representing an electronic signature. Electronic signature engine 106 may also affix the electronic signature to a document and transmit the "signed" document to user terminal 104 for displaying to the user. In some embodiments, one or more components of electronic signature engine 106 may be placed behind a load balancer to support high availability and ensure real-time (or near real-time) processing of data representing a user signature, consistent with disclosed embodiments.

Database 112 may be configured to store information consistent with the disclosed embodiments. In some aspects, components of system 100 (shown and not shown) may be configured to receive, obtain, gather, collect, generate, or produce information to store in database 112. In certain embodiments, for instance, user terminal 104, electronic signature engine 106, and/or server 110 may deposit the captured signature data to database 112 for storage over communications network 108. By way of example, database 112 may store information associated with a user's electronic signature. The information may include the user's personal information and contact information, transaction information, documents signed by the user, and/or other information. In other aspects, components of system 100 may store information in database 112 without using a computer network 108 (e.g., via a direct connection).

Figure 2:
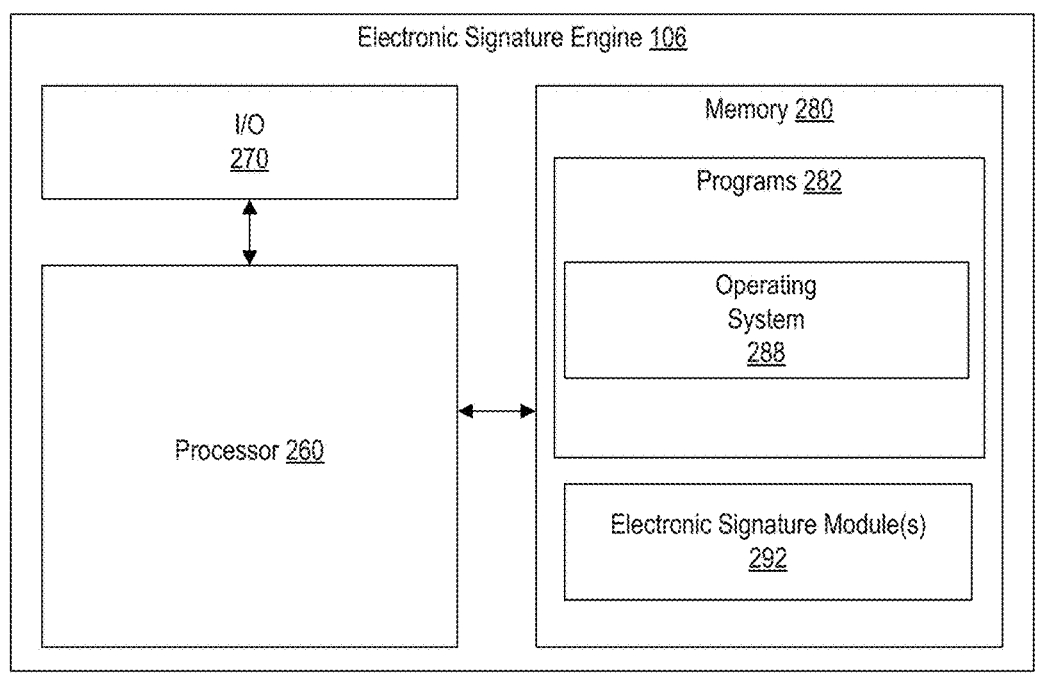
FIG. 2 is a block diagram of an electronic signature engine used in the system of FIG. 1, consistent with disclosed embodiments.

FIG. 2 is a block diagram of an exemplary electronic signature engine 106 configured to perform functions of the disclosed methods, consistent with disclosed embodiments. As shown, electronic signature engine 106 may include one or more processor 260, input/output ("I/O") devices 270, and memory 280 storing data and programs 282 (including, for example, operating system 288). As noted above, electronic signature engine 106 may be part of a user device (e.g., user terminal 104) that has a camera function (e.g., imaging device 102). Alternatively or additionally, electronic signature engine 106 may be a single server or may be configured as a distributed computer system including multiple servers or computers (e.g., server 110) that interoperate to perform one or more of the processes and functionalities associated with the disclosed embodiments. In some embodiments, electronic signature engine 106 is specially configured with hardware and/or software modules for performing functions of disclosed methods. For example, electronic signature engine 106 may include programs 282 (including operating system 288) and/or electronic signature module(s) 292. The modules can be implemented as specialized circuitry integrated within processor 260 or in communication with processor 260, and/or specialized software stored in memory 280 (as depicted in FIG. 2) executable by processor 260.

Processor 260 may be one or more known or custom processing devices designed to perform functions of the disclosed methods, such as a single core or multiple core processors capable of executing parallel processes simultaneously. For example, processor 260 may be configured with virtual processing technologies. In certain embodiments, processor 260 may use logical processors to execute and control multiple processes simultaneously. Processor 260 may implement virtual machine technologies, including a Java® Virtual Machine, or other known technologies to provide the ability to execute, control, run, manipulate, store, etc., multiple software processes, applications, programs, etc. In another embodiment, processor 260 may include a multiple-core processor arrangement (e.g., dual core, quad core, etc.) configured to provide parallel processing functionalities to allow electronic signature engine 106 to execute multiple processes simultaneously. One of ordinary skill in the art would understand that other types of processor arrangements could be implemented that provide for the capabilities disclosed herein.

Electronic signature engine 106 may also include one or more I/O devices 270 that may comprise one or more interfaces for receiving signals or input from devices and providing signals or output to one or more devices that allow data to be received and/or transmitted by electronic signature engine 106. Electronic signature engine 106 may also include interface components that display information and/or provide interfaces to one or more input devices, such as one or more keyboards, mouse devices, and the like, that enable electronic signature engine 106 to receive input from a user (not shown).

Electronic signature engine 106 may include memory configured to store information used by processor 260 (or other components) to perform certain functions related to the disclosed embodiments. In one example, electronic signature engine 106 may include memory 280, comprising one or more storage devices, that store instructions to enable processor 260 to execute one or more applications or software known to be available on computer systems. Alternatively or additionally, the instructions, application programs, etc., may be stored in an internal database or external storage (not shown) in direct communication with electronic signature engine 106, such as one or more database or memory accessible over network 108. The internal database and external storage may be a volatile or non-volatile, magnetic, semiconductor, tape, optical, removable, non-removable, or other type of storage device or tangible (i.e., non-transitory) computer-readable medium.

Electronic signature engine 106 may also be communicatively connected to one or more remote memory devices (e.g., remote databases (not shown)) through network 108 or a different network. The remote memory devices may be configured to store information (e.g., structured, semi-structured, and/or unstructured data) and may be accessed and/or managed by electronic signature engine 106. By way of example, the remote memory devices may be document management systems, Microsoft® SQL database, Share Point® databases, Oracle® databases, Sybase™ databases, or other relational databases. Systems and methods consistent with disclosed embodiments, however, are not limited to separate databases or even to the use of a database.

In one embodiment, electronic signature engine 106 may include memory 280 that includes instructions that, when executed by processor 260, perform one or more processes consistent with the functionalities disclosed herein. Methods, systems, and articles of manufacture consistent with disclosed embodiments are not limited to separate programs or computers configured to perform dedicated tasks. For example, electronic signature engine 106 may include memory 280 that stores instructions constituting one or more programs 282 and/or electronic signature modules 292 to perform one or more functions of the disclosed embodiments. Moreover, processor 260 may execute one or more programs located remotely from system 100. For example, electronic signature engine 106 may access one or more remote programs, that, when executed, perform functions related to disclosed embodiments.

Memory 280 may include one or more memory devices that store data and instructions used to perform one or more features of the disclosed embodiments. For example, memory 280 may represent a tangible and non-transitory computer-readable medium having stored therein computer programs, sets of instructions, code, or data to be executed by processor 260. Memory 280 may include, for example, a removable memory chip (e.g., EPROM, RAM, ROM, DRAM, EEPROM, flash memory devices, or other volatile or non-volatile memory devices) or other removable storage units that allow instructions and data to be accessed by processor 260.

Memory 280 may also include any combination of one or more relational and/or non-relational databases controlled by memory controller devices (e.g., server(s), etc.) or software, such as document management systems, Microsoft® SQL database, Share Point® databases, Oracle® databases, Sybase™ databases, other relational databases, or non-relational databases such as key-value stores or NoSQL™ databases such as Apache HBase™. In some embodiments, memory 280 may comprise an associative array architecture, such as a key-value storage, for storing and rapidly retrieving large amounts of information.

Programs 282 stored in memory 280 and executed by processor(s) 260 may include one or more operating system 288. Programs 282 may also include one or more machine learning, trending, and/or image recognition applications (not shown) that cause processor(s) 260 to execute one or more processes related to recognizing signing device 114 and determining a signature pattern formed by signing device 114.

Figure 3:
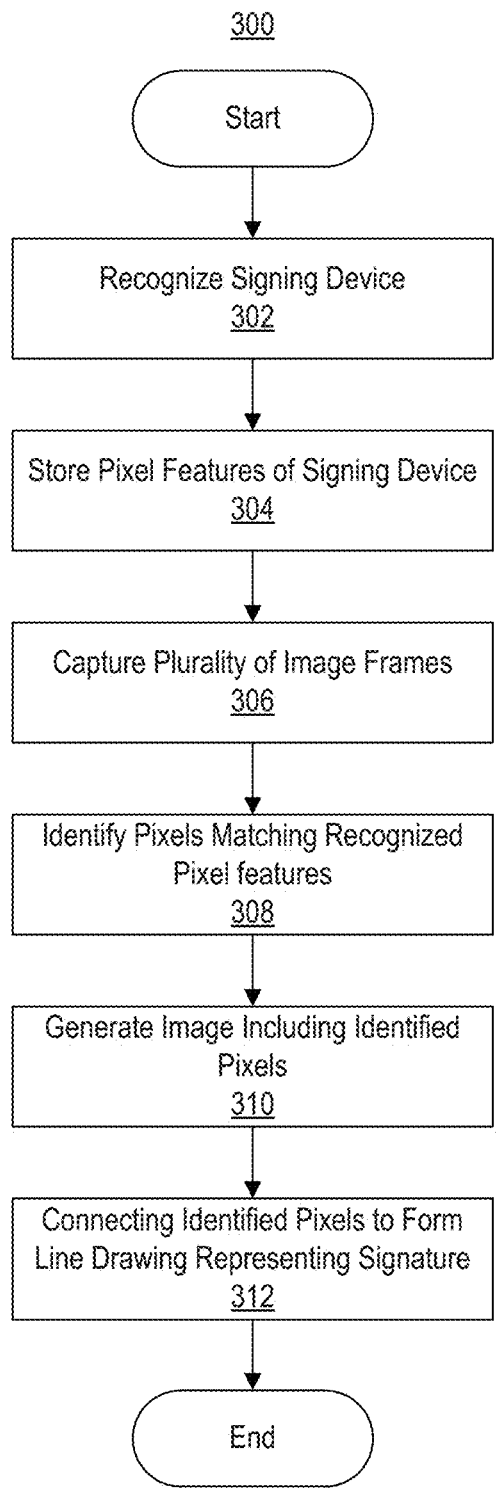
FIG. 3 is a flowchart of an exemplary method for generating an electronic signature, consistent with disclosed embodiments.

FIG. 3 is a flowchart of an exemplary method 300 for generating an electronic signature, consistent with disclosed embodiments. For example, method 300 may be performed by electronic signature engine 106. As described above, a user may move her finger or an object in the air to draw a pattern representing a real signature of the user. Consistent with the disclosed embodiments, method 300 may be used in electronic signature engine 106 to capture the pattern and generate an electronic signature based on the pattern. Referring to FIG. 3, method 300 may include the following steps.

In step 302, electronic signature engine 106 recognizes signing device 114 in an image taken by imaging device 102. Consistent with the disclosed embodiments, signing device 114 may be the user's finger or hand, or an object held by the user. The object may have distinct pixel features, such as distinct color, brightness, shape, etc., such that electronic signature engine 106 can distinguish the object from the surrounding environment based on the pixel features. For example, the object may be a light-emitting device (e.g., a laser pointer, a flashlight on a mobile phone) capable of emitting light, a brightly colored object (e.g., orange, red, or yellow colored object), or an object with a predetermined shape (e.g., a pen-shaped object).

In exemplary embodiments, electronic signature engine 106 may acquire an image of signing device 114 and run an image recognition algorithm to recognize signing device 114 in the image. For example, electronic signature engine 106 may use a finger or hand recognition program to recognize a finger based on the finger's color or shape. As another example, electronic signature engine 106 may recognize signing device 114 based on the contrast of color or brightness between signing device 114 and the background.

In step 304, electronic signature engine 106 stores pixel features of signing device 114. The pixel features may include color information, greyscale values, or shape information of signing device 114. In some embodiments, color information (or color information value(s)) may include, for example, a red-green-blue (RGB) value, a cyan-magenta-yellow-black (CMYK) value, a hue-saturation-lightness (HSL) value, a hue-saturation-value (HSV) value, a HEX value, a pantone matching system (PMS) value, and/or any other system that would define the appearance of a pixel. In some embodiments, to extract the shape information of signing device 114, electronic signature engine 106 may convert a greyscale image containing signing device 114 to a binary image, and determine a foreground in the binary image as signing device 114.

In step 306, when the user moves signing device 114 to draw a signature in the air, electronic signature engine 106 acquires a plurality of image frames of signing device 114. For example, electronic signature engine 106 may control imaging device 102 to capture the plurality of image frames successively in time.

In step 308, in each of the plurality of image frames, electronic signature engine 106 recognizes signing device 114 by identifying pixels matching the pixel features of signing device 114. For example, electronic signature engine 106 may identify pixels matching the color, brightness, or shape of signing device 114.

In step 310, electronic signature engine 106 combines the pixels identified from the plurality of image frames and plots them in a single image.

In step 312, in the single image, electronic signature engine 106 connects the identified pixels to form at least one line drawing representing the signature of the user.

Figure 4:
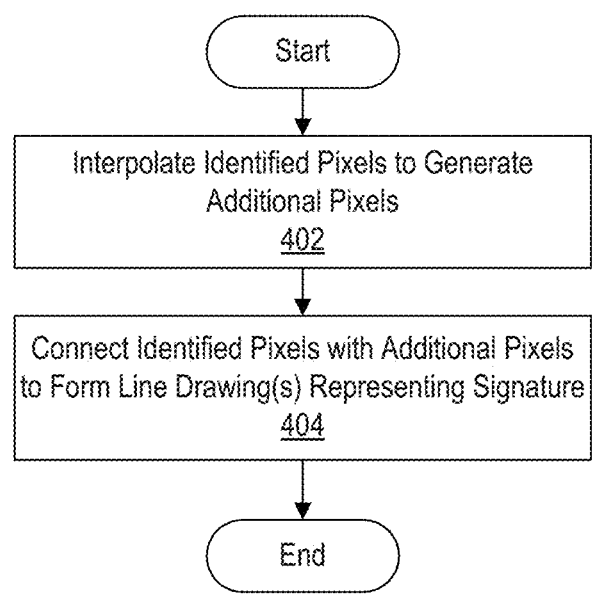
FIG. 4 is a flowchart of an exemplary method for connecting pixels corresponding to signing device, consistent with disclosed embodiments.

In connecting the identified pixels to form the at least one line drawing representing a signature (step 312), the disclosed methods also include features for smoothing the line drawing(s), so as to make the electronic signature look more like the user's real handwritten signature. FIG. 4 is a flowchart of an exemplary method 400 for connecting pixels corresponding to signing device 114, consistent with disclosed embodiments. In step 402, electronic signature engine 106 interpolates the identified pixels in the single image to generate additional pixels. In step 404, electronic signature engine 106 connects the identified pixels with the additional pixels to form at least one line drawing representing the signature of the user. In the disclosed embodiments, other techniques can also be used to smooth the line drawing(s). For example, the plurality of image frames may be captured at an increased frame rate, such that the amount of needed interpolation (step 402) can be reduced.

Figure 5:
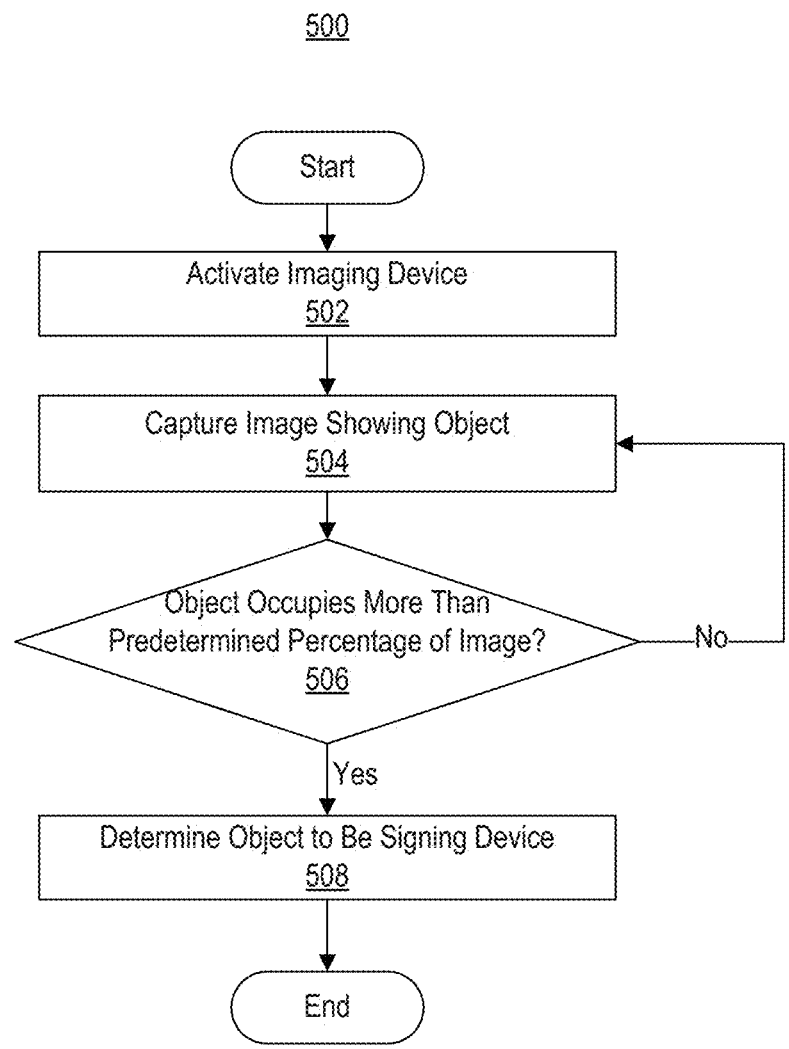
FIG. 5 is a flowchart of an exemplary method for registering a signing device, consistent with disclosed embodiments.

As described above, signing device 114 may be a finger, a hand, or any object held by the user. When electronic signature engine 106 works in the finger or hand based mode, electronic signature engine 106 can recognize the finger or hand based on their skin color. However, when electronic signature engine 106 works in the object based mode, it needs to know what object is selected by the user as the signing device. FIG. 5 is a flowchart of an exemplary method 500 for registering a signing device, consistent with disclosed embodiments. Referring to FIG. 5, method 500 includes the following steps.

In step 502, the user activates imaging device 102. When the user selects an object as signing device 114, the user may place the selected object in front of imaging device 102 to fill most of the image frame taken by imaging device 102. In step 504, electronic signature engine 106 controls imaging device 102 to capture an image of the object. In step 506, electronic signature engine 106 determines whether the object occupies more than a predetermined percentage of the image. If the object occupies more than the predetermined percentage of the image, electronic signature engine 106 proceeds to step 508 and determines that the object is the selected signing device 114. However, if the object does not occupy more than the predetermined percentage of the image, electronic signature engine 106 determines that the object is not the selected signing device 114. Consistent with the disclosed embodiments, steps 504 and 506 may be repeated until electronic signature engine 106 determines an imaged object to be the signing device 114.

Figure 6:
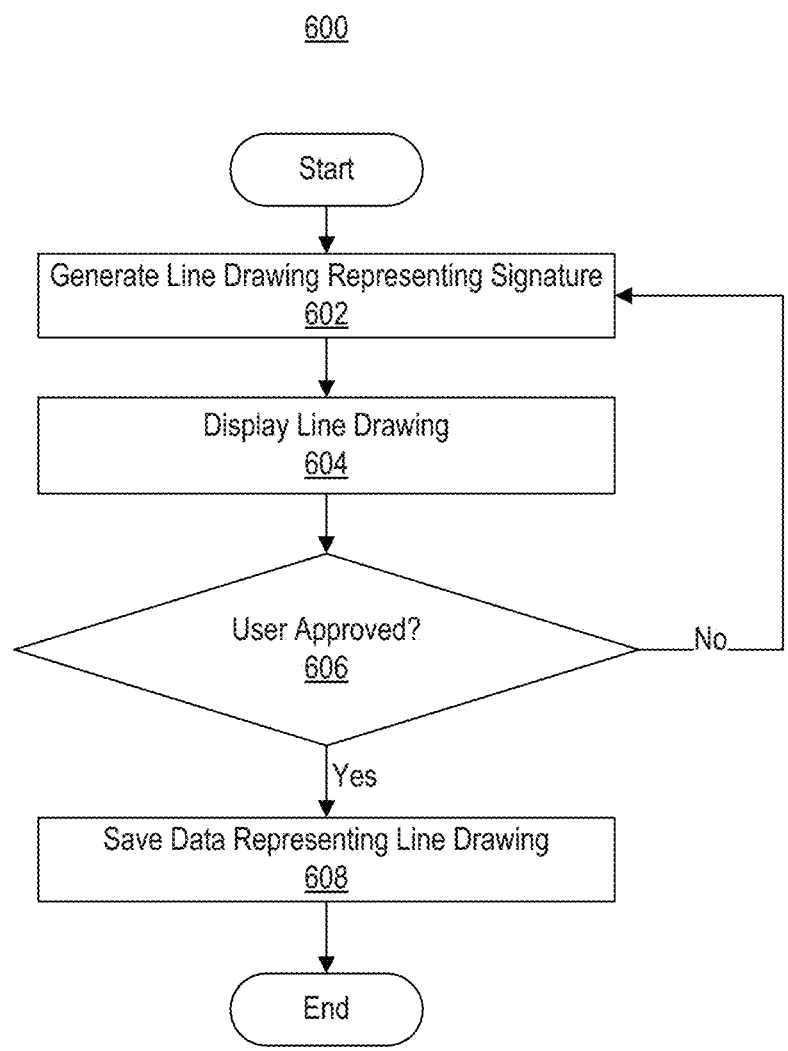
FIG. 6 is a flowchart of an exemplary method for generating an electronic signature based on user feedback, consistent with disclosed embodiments.

Consistent with the disclosed embodiments, after the electronic signature is generated, electronic signature engine 106 may display the electronic signature to the user and ask the user to confirm whether she is satisfied with the electronic signature. FIG. 6 is a flowchart of an exemplary method 600 for generating an electronic signature based on user feedback, consistent with disclosed embodiments. Referring to FIG. 6, in step 602, electronic signature engine 106 generates at least one line drawing representing a signature. For example, the line drawing may be generated according to method 300. In step 604, electronic signature engine 106 displays the at least one line drawing in a graphical user interface (GUI). For example, the GUI may be implemented on user terminal 104. Electronic signature engine 106 may also control the GUI to display a message requesting the user to approve the line drawing(s). In step 606, electronic signature engine 106 receives a user input and determines whether the user approves the line drawing(s) based on the user input. If it is determined that the user approves the line drawing(s), electronic signature engine 106 moves to step 608 and saves the at least one line drawing as an electronic signature. If it is determined that the user does not approve the line drawing(s), electronic signature engine 106 generates a ready signal indicating that imaging device 102 is ready to capture another signature and prompting the user to record a new signature.

Figure 7:
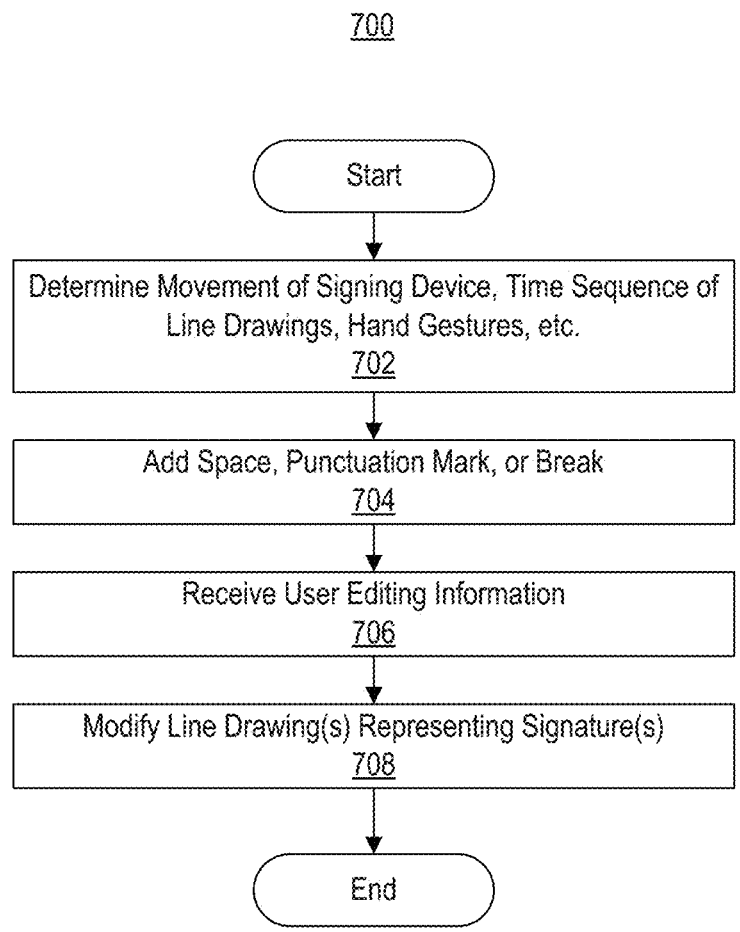
FIG. 7 is a flowchart of an exemplary method for editing an electronic signature, consistent with disclosed embodiments.

The disclosed methods also provide a variety of mechanisms for adding a space or a punctuation mark in a captured electronic signature, or recognizing a break between two separate parts (e.g., a break at which the lines forming a signature is broken) of the captured electronic signature. FIG. 7 is a flowchart of an exemplary method 700 for editing an electronic signature, consistent with disclosed embodiments. Referring to FIG. 7, method 700 may include the following steps.

In step 702, concurrently with or after the generation of the at least one line drawing representing a signature, electronic signature engine 106 also determines various features of sign device 114 or the line drawing(s), based on the plurality of image frames of signing device 114. For example, electronic signature engine 106 may determine a moving direction or distance of signing device 114 during the capturing of the signature. As another example, when multiple line drawings are generated, electronic signature engine 106 may determine a time sequence of the line drawings. As another example, when signing device 114 is a hand or finger, electronic signature engine 106 may determine whether any hand gesture is formed during the capturing of the signature.

In step 704, electronic signature engine 106 adds a space, a punctuation mark, or a break to the generated electronic signature based on the determination result in step 702. In the disclosed embodiments, electronic signature engine 106 avoids interpolating at the spaces, punctuations, and breaks.

In some embodiments, when it is determined that signing device 114 significantly changes its moving direction during the capturing of the signature, electronic signature engine 106 adds a space, a punctuation mark, or a break in the line drawing(s) representing the signature.

In some embodiments, when it is determined that signing device 114 moves along certain direction for longer than a predetermined distance during the capturing of the signature, electronic signature engine 106 adds a space, a punctuation mark, or a break in the line drawing(s) representing the signature.

In some embodiments, when signing device 114 is a hand or finger and it is determined that the hand gesture changes or a particular gesture is formed (e.g., retracting index finger to form a fist), electronic signature engine 106 adds a space, a punctuation mark, or a break in the line drawing(s) representing the signature.

In some embodiments, when multiple line drawings representing signatures are generated at different points in time, electronic signature engine 106 may add a space, a punctuation mark, or a break to separate the multiple line drawings.

Electronic signature engine 106 may also provide a means for the user to post-edit the generated electronic signature. In step 706, electronic signature engine 106 displays, in a GUI (e.g., in a user interface of user terminal 104), the at least one line drawing representing the signature and a message prompting the user to edit the line drawing(s). Electronic signature engine 106 may subsequently detect user input on the GUI for editing the at least one line drawing. For example, the user may erase certain parts of the line drawing(s) or enter a command for adding a space, a punctuation mark, or a break to the line drawing(s).

In step 708, electronic signature engine 106 modifies the at least one line drawing according to the user input and generates a message prompting the user to confirm the modification. If the user confirms the modification, electronic signature engine 106 saves the modified line drawing(s) as an electronic signature.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:
1. A computer-implemented method for generating electronic signatures, comprising:
 storing pixel features of a signing device, wherein the storing comprises:

capturing, via an imaging device, a first image showing an object, determining whether the object occupies more than a predetermined percentage of the first image, and when it is determined that the object occupies more than the predetermined percentage of the first image, determining the object to be the signing device;

capturing, via the imaging device, a plurality of image frames including the pixel features of the signing device;

identifying in the plurality of image frames, by a processor, first pixels matching the stored pixel features of the signing device;

generating, by the processor, a second image including the identified pixels; and connecting, by the processor, the identified pixels to form at least one line drawing representing a signature.

2. The computer-implemented method of claim 1, wherein the signing device is at least one of a hand, a finger, a light-emitting device, a colored object, or an object with a predetermined shape.

3. The computer-implemented method of claim 1, wherein the plurality of image frames is captured successively in time.

4. The computer-implemented method of claim 1, wherein the pixel features of the signing device comprise:

color information including at least one of a red-green-blue (RGB) value, a cyan-magenta-yellow-black (CMYK) value, a hue-saturation-lightness (HSL) value, a hue-saturation-value (HSV) value, a hexadecimal value, or a Pantone matching system (PMS) value.

5. The computer-implemented method of claim 1, wherein the pixel features of the signing device comprise greyscale values.

6. The computer-implemented method of claim 1, wherein the pixel features of the signing device comprise shape information based on greyscale values of the signing device in a binary image.

7. The computer-implemented method of claim 1, wherein connecting the identified pixels to form line drawings representing a signature comprises:

interpolating the identified pixels in the second image to generate additional pixels; and connecting the identified pixels with the additional pixels to form the at least one line drawing representing the signature.

8. The computer-implemented method of claim 1, wherein connecting the identified pixels to form line drawings representing a signature comprises:

capturing the plurality of image frames at an increased frame rate to smooth the at least one line drawing.

9. The computer-implemented method of claim 1, further comprising:

detecting a moving direction of the signing device based on the plurality of image frames; and generating a space, a punctuation mark, or a break in the at least one line drawing representing the signature based on a change of the moving direction.

10. The computer-implemented method of claim 1, further comprising:

detecting a moving distance of the signing device along a first direction, based on the plurality of image frames; and generating a space, a punctuation mark, or a break in the at least one line drawing representing the signature when the moving distance along the first direction exceeds a predetermined threshold.

11. The computer-implemented method of claim 1, wherein:

the signing device is a finger or a hand; and the method further comprises:

detecting a change of a gesture of the finger or hand; and generating a space, a punctuation mark, or a break in the at least one line drawing representing the signature based on the change of the gesture.

12. The computer-implemented method of claim 1, further comprising:

displaying the at least one line drawing representing the signature in a graphical user interface; and modifying the at least one line drawing representing the signature based on user input on the graphical user interface.

13. The computer-implemented method of claim 12, wherein modifying the at least one line drawing representing the signature comprises:

adding a space, a punctuation, or a break in the at least one line drawing representing the signature based on the user input.

14. The computer-implemented method of claim 1, further comprising:

generating, at different points in time, first line drawings representing a first signature, and second line drawings representing a second signature; and generating a space, a punctuation mark or, a break to separate the first line drawings and the second line drawings.

15. The computer-implemented method of claim 1, further comprising:

acquiring confirmation information from a user;

determining, based on the confirmation information, whether the user approves the at least one line drawing representing the signature;

in response to determining that the user approves the at least one line drawing, saving data representing the at least one line drawing; and in response to determining that the user does not approve the at least one line drawing, generating a ready signal prompting the user to record a new signature.

16. The computer-implemented method of claim 15, further comprising:

before acquiring the confirmation information from the user, displaying, in a graphical user interface, the at least one line drawing representing the signature and a message requesting the user to approve the line drawings.

17. The computer-implemented method of claim 1, wherein:

the connecting generates at least two line drawings, and the connecting further comprises determining a time sequence of the at least two line drawings.

18. A computer-implemented method for generating electronic signatures, comprising:

storing pixel features of a finger, wherein the storing comprises:

capturing, via an imaging device, a first image showing an object;

determining whether the object occupies more than a predetermined percentage of the first image; and when it is determined that the object occupies more than the predetermined percentage of the first image, determining the object to be the signing device;

capturing, via the imaging device, a plurality of image frames of a finger;

identifying in the plurality of image frames, by a processor, first pixels representing the finger, based on pixel features of the first pixels;

generating, by the processor, a second image including the identified pixels;

connecting, by the processor, the identified pixels to form at least one line drawing representing a signature.

19. The computer-implemented method of claim 18, further comprising:

detecting a change of a gesture of the finger; and generating a space, a punctuation mark, or a break in the line drawings representing the signature based on the change of the gesture.

20. A system for generating electronic signatures, comprising:

an imaging device;

a memory storing instructions; and a processor in communication with the imaging device, the processor being configured to execute the instructions to:

store pixel features of a signing device, wherein the storing comprises:

capturing, via the imaging device, a first image showing an object, determining whether the object occupies more than a predetermined percentage of the first image, and when it is determined that the object occupies more than the predetermined percentage of the first image, determining the object to be the signing device;

control the imaging device to capture a plurality of image frames showing the signing device;

identify, in the plurality of image frames, pixels matching the recognized pixel features of the signing device;

generate a second image including the identified pixels; and connect the identified pixels to form at least one line drawing representing a signature.

* * * * *